A. D. TUTTLE.
COMBINED APPLICATOR, CONTAINER, AND SWAB.
APPLICATION FILED DEC. 14, 1914.
1,131,575.  Patented Mar. 9, 1915.
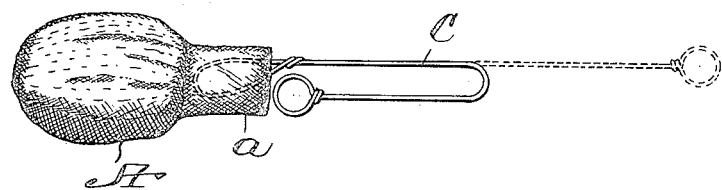
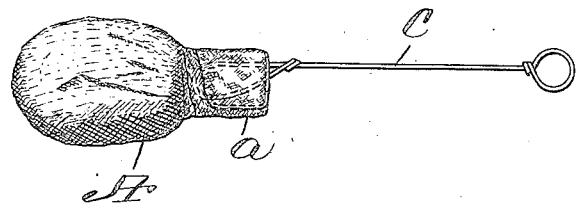
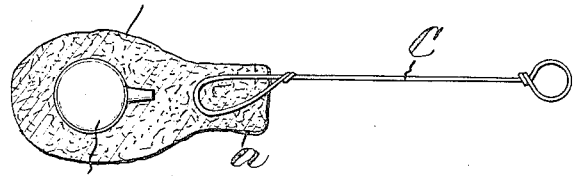

UNITED STATES PATENT OFFICE.

ARNOLD D. TUTTLE, OF WASHINGTON, DISTRICT OF COLUMBIA.

COMBINED APPLICATOR, CONTAINER, AND SWAB.

1,131,575. Specification of Letters Patent. Patented Mar. 9, 1915.

Application filed December 14, 1914. Serial No. 877,190.

*To all whom it may concern:*

Be it known that I, ARNOLD D. TUTTLE, a citizen of the United States, stationed at Washington, in the District of Columbia, have invented certain new and useful Improvements in Combined Applicators, Containers, and Swabs; and I do hereby declare the following to be a full, clear, and exact description of the invention, such as will enable others skilled in the art to which it appertains to make and use the same.

My invention relates to a device or combination for transporting and applying liquids, in which the liquid, preferably and usually in small quantities as governed by purpose for which intended, may be safely and conveniently carried in a friable and preferably hermetically sealed container inclosed in a pad, or pocket, or mop, or bag, or swab of absorbent material, and in which the liquid container may be crushed when it is desired to use the same, permitting the liquid to permeate and be taken up by the inclosing absorbent mass, rendering it available for various uses.

The invention is especially adapted for use for surgical purposes, such, for example, as to carry suitable quantities of tincture of iodin, or a preparation thereof, in "first aid to the injured packages", or for other purposes where it is desired to store or carry a liquid in a safe way, protected against ordinary accidents, and yet to have the liquid ready for instant and easy application when desired.

The invention is also adapted for containing quantities, preferably small, of benzin, ether, alcohol or other cleansing liquids, or for various other uses.

The general principles of my invention will be understood by reference to the accompanying drawings, in which:

Figure 1 shows the device provided with a long handle, which may be bent for inclosing in a short package; Fig. 2 shows the device with a shorter handle; Fig. 3 shows a central section through the device of Fig. 2 with the liquid container in elevation; and Fig. 4 shows the device used without a handle as in any contingency wherein contact of fingers with the swab is not contra-indicated, as in removing grease-spots from clothing.

A represents the outer holder which may be preferably made of absorbent textile material, such as cotton or linen fabric or what in surgical work is commonly called "gauze", which forms a bag or pouch having walls, of sufficient thickness, forming a series of layers of the absorbent material, inclosing the friable and preferably hermetically sealed liquid container B, which is preferably made of glass, or other friable material adapted to be crushed by a blow of the hand or any other solid object. The shape of the container can be varied, but a slightly ovoid type is preferred.

In the neck $a$ of the receptacle A a suitable handle C is preferably secured, which handle may be short, as shown in Figs. 2 and 3, or long as shown in Fig. 1. This handle may be laid back on itself, as shown in Fig. 1, for convenience of storage, and then straightened out for use. If desired, the handle may be dispensed with and the device constructed as shown in Fig. 4. For special uses the absence of a handle would render the practical application of my device much easier. The handle is intended to keep one's fingers from contact with the swab, as in surgical work.

It will be seen that, if the liquid container B be crushed, the particles of glass, or other friable material composing the same, will be confined, or retained, by the fibrous mass constituting the pouch A, and the liquid will immediately permeate the fibrous material and may then be applied by the user for the various purposes for which the device is adapted, such as preparing the patient for surgical intervention, as a dressing in and around wounds, removing spots from clothing, eradicating ink-stains. Other examples could be cited.

To prevent foreign matter from coming in contact with the swab when the liquid container is being crushed preparatory for use, a covering, such as folded paper, or an envelop, more or less but not necessarily transparent, is preferable. When used for surgical purposes the whole device including envelop can be rendered sterile.

It will be seen that the liquid container may be safely carried inclosed in the soft walls of the pouch, and yet may be quickly broken and the liquid, in being absorbed by the fabric, be available for instant application when desired.

The underlying principle of this device is the determination, according to the use for which intended, of the quantity of liquid necessary to be placed in the sealed container, which in escaping from the friable container, will sufficiently saturate the absorbent material. The size of device, as a whole, of the container, and thickness of walls of absorbent material inclosing it are governed accordingly.

It will be noted that the friable container is sealed, has no stopper to become loose and permit escape of contents, and that the device itself affords its own protection to the container, and at the same time serves as an absorbent mass to be saturated with the liquid for application when the container is broken.

An especial adaptation of this invention, and what I particularly had in mind in devising it, follows: Each individual soldier, especially in the United States Army, when on field service, carries on his person a surgical package for his immediate use as a protective dressing when wounded. This is commonly known as a "first aid packet." The contents of this packet are essentially sterile gauze compresses and bandage. This dressing is applied by the soldier himself or by a comrade. Observation during recent wars has emphasized the necessity for and lack of a convenient means of providing soldiers with tincture of iodin or preparations thereof, for immediate application to the wound and surrounding area before the surgical dressing is applied. Modern surgical experience has confirmed the great advantage that an application of iodin under these conditions possesses. Therefore I particularly propose to urge that my device be adopted and included in the "first aid packet" or otherwise carried by the soldier on his person. Then it can be always and immediately available for speedy and convenient use in a clean and preferably sterile condition.

I believe that the basic principles of my device, comprising as it does a combination of applicator, container and swab in a single unit, and for surgical purposes in a sterile condition, is a novelty never before suggested and possesses great practical merit.

While I have described a few uses to which said device is applicable, it will be obvious that it is adapted for a great many other uses, in which it is desired to safely and conveniently transport a liquid, preferably in small quantities, and provide an absorbent pad saturated with said liquid instantly when desired.

In the manufacture of this absorbent pad I preferably use a series of layers of absorbent textile fabric, but I do not mean to limit the invention to any particular form of absorbent pad; or to any particular form of friable liquid container inclosed in said pad.

Having thus described my invention what I claim and desire to secure by Letters Patent of the United States is:—

A device for transporting and applying liquids comprising an absorbent, hollow pad, and a friable liquid container containing liquid connected to said pad, and with a handle also connected to said pad, substantially as described.

In testimony whereof, I affix my signature, in presence of two witnesses.

ARNOLD D. TUTTLE.

Witnesses:
ERNEST WILKINSON,
M. L. BENZLER.